(12) United States Patent
Rose

(10) Patent No.: US 6,227,387 B1
(45) Date of Patent: May 8, 2001

(54) APPARATUS FOR SUPPORTING UTENSILS

(75) Inventor: Robert J. Rose, 592 Aleta Pl., Pleasant Hill, CA (US) 94523

(73) Assignee: Robert J. Rose, Pleasant Hill, CA (US)

( * ) Notice: Subject to any disclaimer, the term of this patent is extended or adjusted under 35 U.S.C. 154(b) by 0 days.

(21) Appl. No.: 09/569,977

(22) Filed: May 12, 2000

Related U.S. Application Data

(63) Continuation-in-part of application No. 09/376,145, filed on Aug. 17, 1999.

(51) Int. Cl.[7] ............................................. A47F 7/00
(52) U.S. Cl. ................................ 211/85.29; 211/94.01; 211/113; 211/162; 248/317
(58) Field of Search ...................... 211/85.29, 94.01, 211/94.02, 162, 113; 248/317, 323

(56) References Cited

U.S. PATENT DOCUMENTS

| | | |
|---|---|---|
| 1,132,190 | 3/1915 | Kohout . |
| 2,606,666 | 8/1952 | Gray ..................................... 211/113 |
| 3,116,837 | 1/1964 | Kelly ..................................... 211/94 |
| 4,290,537 | 9/1981 | Lazarus, III .......................... 211/71 |
| 4,427,119 | 1/1984 | Savino ................................... 211/94 |
| 4,776,469 | * 10/1988 | Geliziunas . |
| 4,944,417 | 7/1990 | Datlow ................................. 211/84 |
| 5,238,127 | 8/1993 | Geller . |
| 5,590,940 | 1/1997 | Richard ................................ 312/287 |
| 5,833,080 | 11/1998 | Donne ................................ 211/85.31 |
| 6,021,906 | 2/2000 | Troy ..................................... 211/41.3 |
| 6,039,191 | * 3/2000 | Purnell .............................. 211/113 X |

OTHER PUBLICATIONS

"Kitchens", Better Homes & Garden Books, Copyright 1996.

* cited by examiner

*Primary Examiner*—Robert W. Gibson, Jr.

(57) ABSTRACT

An apparatus for supporting utensils utilizing a base member which includes a surface extending along the base member. The base member is linked to a structure, such as a cabinet, and may be movable relative to the same. A plurality of holders are connected to the surface of the base member to position utensils in a pendant mode. Sound attenuating devices are interposed adjacent utensils to absorb sound normally generated by utensils contacting one another.

12 Claims, 3 Drawing Sheets

APPARATUS FOR SUPPORTING UTENSILS

This appln is a CIP of 09/376,145 Aug. 17, 1999.

BACKGROUND OF THE INVENTION

The present invention relates to a novel and useful apparatus for supporting utensils which is useful in the field of culinary arts.

Cooking utensils such as pots, pans, forks, knives, and the like always needed to prepare food and foodstuffs. Organizing such items is often laborious and confusing. Ideally, utensils should be hung and from a storage structure, such as a cabinet, for accessibility.

In the past, systems have been devised for holding clothing items, and other soft goods, for easy retrieval. U.S. Pat. Nos. 3,116,837, 4,427,119, and 5,590,940 describe sliding holders for ties.

U.S. Pat. No. 2,606,666 shows a cup rack in which cups are supported from a sliding U-shaped member.

Placing items such as pots and pans on a sliding support in a cabinet have proved undesirable in the past since any movement of pots and pans generates clanking or clinking noises, which can be extremely annoying.

An apparatus for supporting utensils which provides easy accessibility and eliminates noises due to movements of the utensils would be a notable advance in the culinary art field.

BRIEF SUMMARY OF THE INVENTION

In accordance with the present invention a novel and useful apparatus for supporting utensils is herein provided.

The apparatus includes a base member having a surface which extends along a select dimension. The base member is linked to a structure such as a cabinet, cupboard, shelving unit, and the like. The base member may be formed with the storage structure, or retrofitted separately in accordance with the present invention. The base member may also include means for moving the base member relative to the storage structure. In such a case, an elongated element may be connected to the structure and the base member may slidingly engage the elongated element. Thus, the base member can move inwardly and outwardly relative to the storage structure being employed in the present application. Again, the base member may be a separate item or integrally constructed with the storage unit.

A plurality of fasteners for holding are connected to the surface of the base member. Each of the fasteners is capable of holding a utensil in a pendant or hanging mode. Thus, when the base member is moved relative to the storage structure, the surface of the base member travels inwardly and outwardly relative to the storage structure and positions the utensils, hanging therefrom, into an accessible position, or into a storage position, as the case may be. A plurality of holders may take the form of hooks, clips, magnetic holders, hook and pile connectors, and the like.

Sound attenuating means is also employed in the present invention for absorbing sound generated at least by a first and second utensil contacting one another when in the pendant mode. Such sound is normally associated with movement of the base member relative to the storage structure and the swinging action induced in the hanging utensils. The sound attenuating means may take the form of an element positioned between the first and second utensils, or interposed between two or more utensils. The sound attenuating means may also depend from the surface of the base member and include an element which is positioned between each of the hanging or pendant utensils. In certain cases, the sound attenuating means may include an element which is a hollow member and a line which is passed through the hollow member to permit the hollow member to at least partially surround the line. Means is also provided in one of the embodiments of the present invention for adjusting the distance between the hollow member and the surface of the base member. Such means may take the form of forming the line into a loop such that the hollow member slidingly engages the line. In many instances, the loop may be formed into a figure-eight configuration such that two strands or bights pass through the hollow member. Thus, the hollow member is adjusted outwardly or toward the surface of the base member to properly absorb sound between adjacent utensils.

It may be apparent that a novel and useful apparatus for supporting utensils has been herein described.

It is therefore an object of the present invention to provide an apparatus for supporting utensils which is capable of moving utensils inwardly and outwardly from a storage structure for utensils.

Another object of the present invention is to provide an apparatus for supporting utensils to a structure which absorbs any sound generated by the contact between adjacent utensils held thereto.

Another object of the present invention is to provide an apparatus for supporting utensils which may be easily retrofitted to existing storage structures for utensils and is aesthetically pleasing.

A further object of the present invention is to provide an apparatus for supporting utensils to a structure which is capable of deadening sound due to the moving of adjacent utensils which is adjustable to utensils of different sizes.

Another object of the present invention is to provide an apparatus for supporting utensils which is simple to manufacture and to maintain.

Another object of the present invention is to provide an apparatus for supporting utensils which is space saving, maintains cleanliness, hides from view, and eliminates damage due to denting, scratching, and the like, to the utensils.

The invention possesses other objects and advantages especially as concerns particular characteristics and features thereof which will become apparent as the specification continues.

For a better understanding of the invention reference is made to the following detailed description of the preferred embodiments which should be taken in conjunction with the hereinabove described drawings.

DETAILED DESCRIPTION OF THE PREFERRED EMBODIMENTS OF THE INVENTION

Various aspects of the present invention will evolve from the following detailed description of the preferred embodiments thereof which should be taken in conjunction with the prior delineated drawings.

Figure 1:
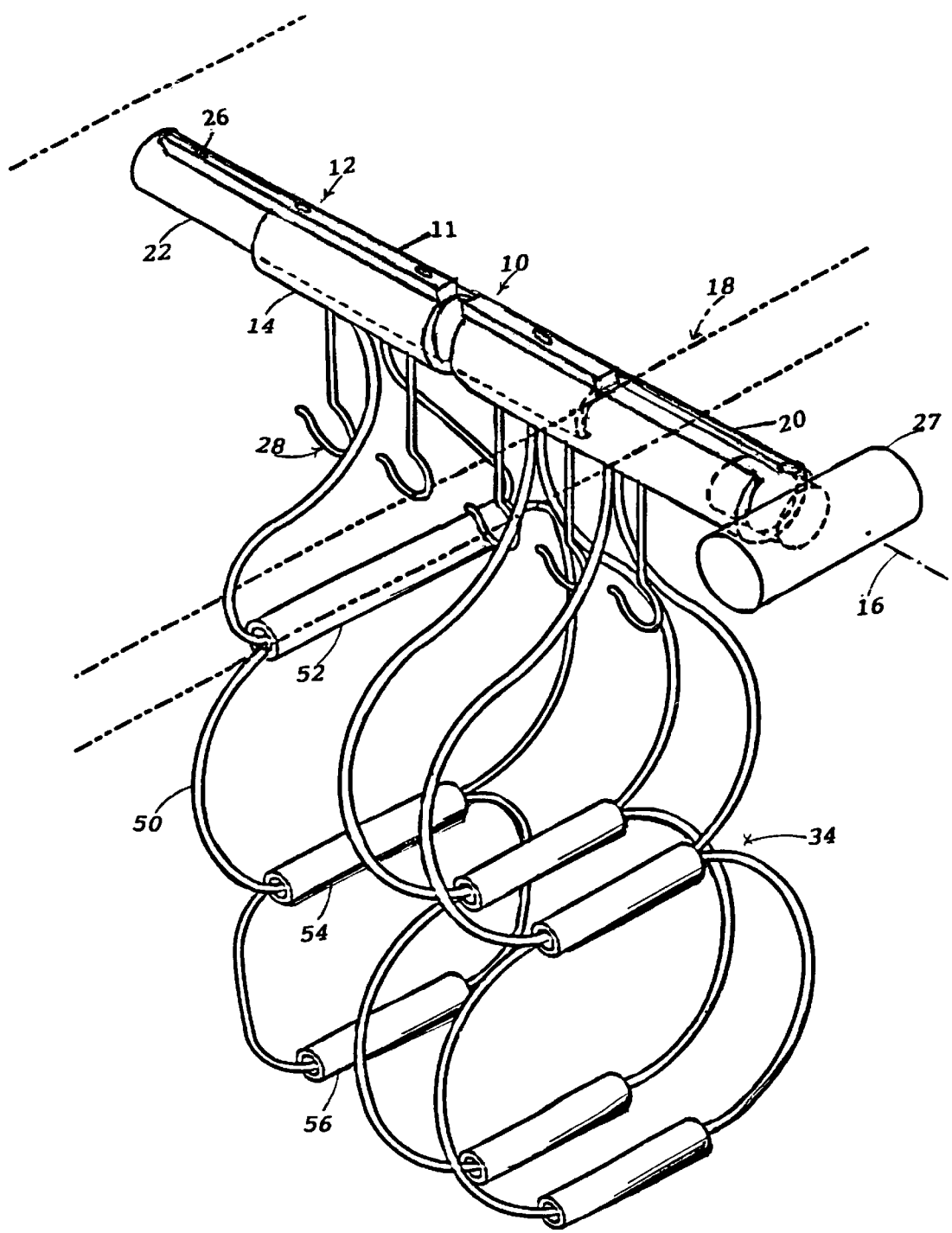
FIG. 1 is a top left perspective view of the apparatus of the present invention in place.
Figures 2A, 2B:
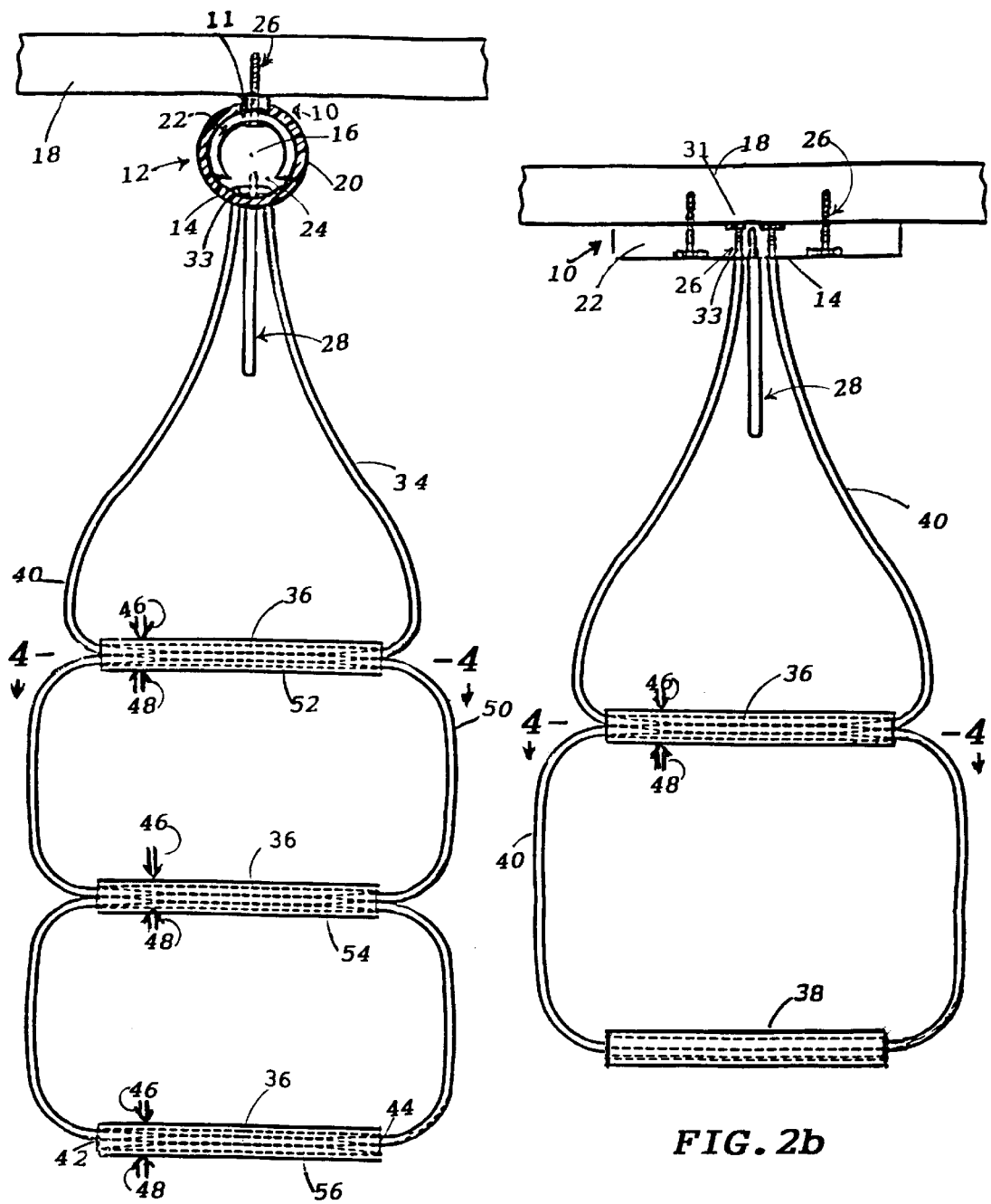
FIG. 2a is a front elevational view of the apparatus of the present invention with the base member depicted in section, means to size down strands or bights to pot and pan (see FIG. 4).
FIG. 2b is a front elevational view of the apparatus of the present invention with the base member formed integrally with moveable shelf or plate of the storage unit.

The invention as a whole is shown in the drawings by reference character 10. Apparatus 10 includes as element, a base member 12, with a track 11. Base member 12 includes a surface 14 which extends along an axis 16. Base member 12, with a stopper 19, is linked to a structure 18 which may be a cabinet, shelf, and the like. Base member 12 is depicted, shown in drawings as possessing a semi-cylindrical body 20, which extends along axis 16. An elongated member 22 fits within a cavity 24 of member 20 and 11 held to structure 18 by a plurality of fasteners, such as fastener 26. Semi-cylindrical member 20 is slidingly movable with respect 11 fixed elongated member 22. It should also be noted, that semi-cylindrical member 20 terminates in handle 27, which allows the user to move base member 12 and 14 back and forth along axis 16. Other structures. FIG. 2b, may be devised for base member 22, such as a moveable shelf, plate, integrally formed with structure 18.

Figure 3:
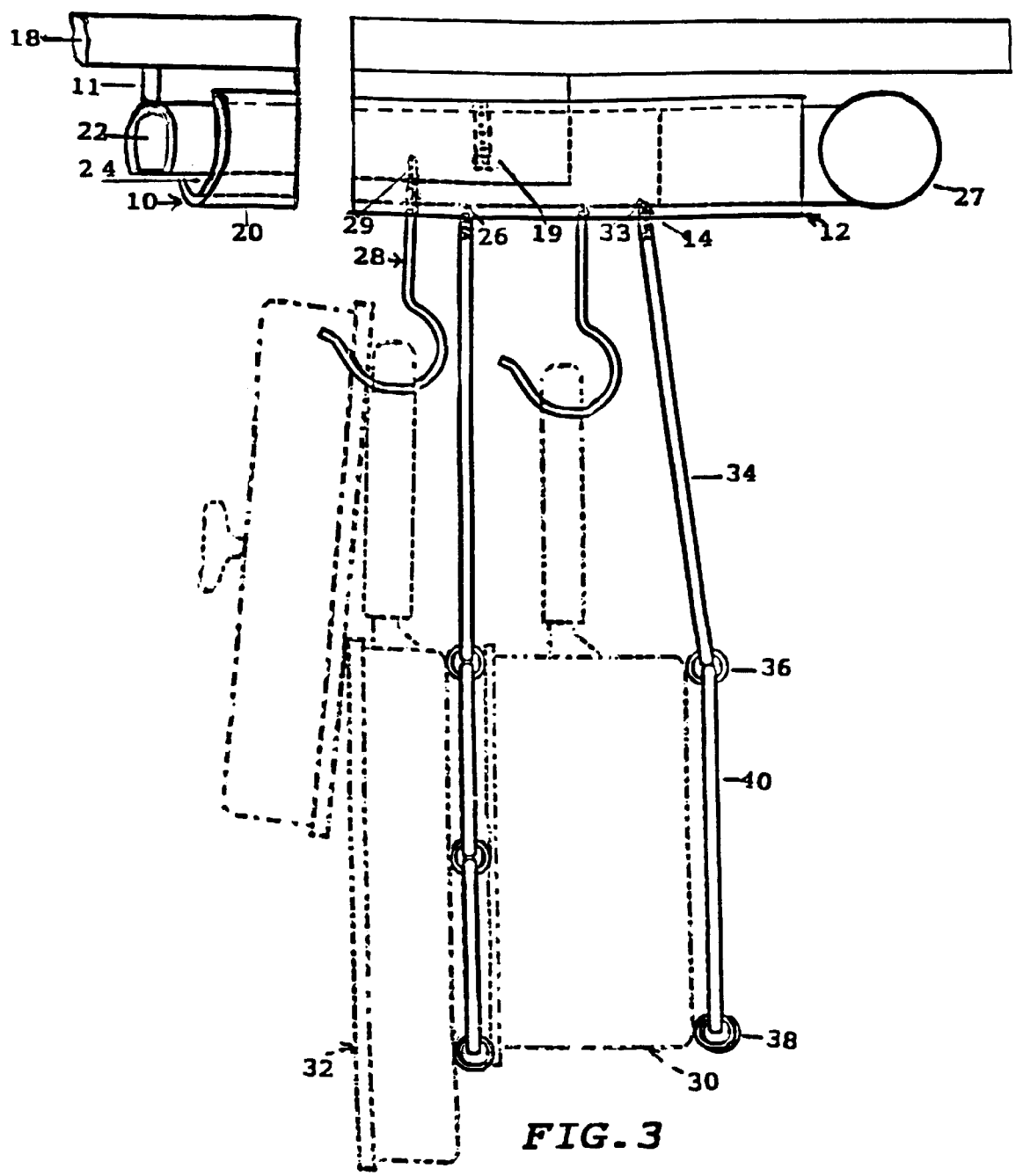
FIG. 3 is a broken side view of the apparatus of the present invention in place with utensils depicted in phantom.

A plurality of fasteners for holding 28, connect to surface 14 of base member 12, FIG. 3. Holders 28 may take the form of snaps, magnets, hooks, clips, and the like. As depicted in the drawings, plurality of holders 28 with connector 29 are in form of hooks. Each of the plurality of hooks 28 is capable of holding a utensil in a downwardly hanging or pendant mode. With reference, again, to FIG. 3, it may be observed that pot 30 and pan 32 are supported adjacent one another.

Sound attenuating means 34 is also illustrated in the present invention. Sound attenuating means 34 is intended to be hanging from base member by inset holes 33, glue, or the like, to absorb any sound generated by utensils contacting one another. For example, normally pot 30 and pan 32 would form a clanking sound when base member 12 is moved. Sound attenuating means 34 is depicted in the embodiments shown by a pair of hollow members 36 and 38, which is formed of a material that is softer than that used to construct pot 30 or pan 32. For example, a rubber, plastic, paper, or other material would suffice in this regard.

Figure 4:
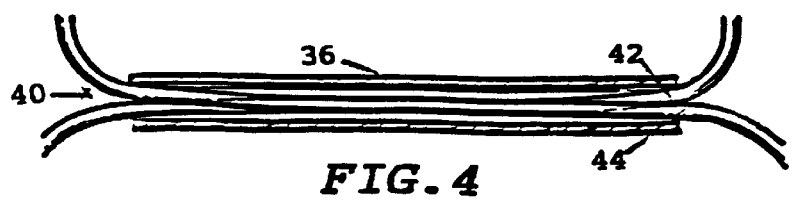
FIG. 4 is sectional view taken along line 4—4, FIGS. 2a–b.

A line 40 passes through the inside of both hollow members 36 and 38, forming a closed loop. Reference is made to FIG. 4 in which hollow member 36 is depicted showing the crisscrossing line 40 in which strands, or bights, 42 and 44 lie within hollow member 36. The application of force, force arrows 46 and 48, to hollow member 36 permits hollow member 36 to move upwardly or downwardly relative to pot or pan, 30 and 32, respectively. In this way, the positioning of hollow member 36 maximizes the sound attenuating capability. Such movement is illustrated in phantom on FIG. 3. It should be realized that sound attenuating means 34 may take other embodiments. Also, it should be seen that sound attenuating device 50 includes a trio of hollow members 52, 54, and 56. Hollow members 52 and 54 are adjustable upwardly or downwardly relative to surface 14 of base member 12.

It further should be noted, the trio of hollow members allows sizing upward or downward for pot 30 or pan 32. It also provides an alternate means of securing strands 42 or bights 44 as illustrated in phantom by FIG. 2a, and FIG. 4, at hollow member 36. FIG. 2b, in phantom illustrates a more finalized method using fasteners 26 to secure lines 40 within apparatus 10, to elongated member 22, thru inset holes 33, having recessed enlarged counter bores 31 when attached by use of fasteners 26 to intregally formed moveable structure 18. When pulled outward or pushed inward will start and stop as structure 18 allows.

Otherwise such fastening takes place through base member 12 by means of elongated member 22 which then slipped over within member 20 by grasping handle 27. Elongated member 22 is by means of track 11 attached to structure 18 with fasteners 26. Track 11 serves as template to structure 18 where holes be drilled to receive fasteners 26 as well as to stablize while it guides semi-cylindrical member 20 when pulled or pushed at handle 27. Affixed base member 22 extending downward in stalactite manner near handle 27 is stopper base member 19. The final last fastener for holding 28, connector 29 is projecting upward shown in phantom FIG. 3 in stalagmite proportions indicated as and when the two encounter handle 27 will cease movement.

In either event before attachment of apparatus 10 to structure 18, line 40 or strands 42 and bights 44 should first be in place through inset holes 33.

In operation the user then places pot 30 and pan 32 on any of the plurality of holders 28. Sound attenuating means 34 is then adjusted between adjacent utensils held to apparatus 10 in a pendant fashion. For example, sound attenuating means 34 is employed using hollow members 36 and 38 between pot 30 and pan 32 as depicted in drawings. Thus, the movement of apparatus 10 inwardly and outwardly relative to structure 18 will not generate excessive noise due to the contact between utensils, such as pot 30 and pan 32.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A utensil supporting apparatus with sound attenuating means, said apparatus comprising:
   a. a base member having a surface, said base member mountable on a structure;
   b. a plurality of fasteners mounted on said base member, said fasteners for holding utensils in a pendant mode;
   c. sound attenuating means depending from said base member surface, said sound attenuating means positioned between each of said utensils.

2. The apparatus of claim 1, wherein said sound attenuating means includes an element which is a hollow member, and a line which is passed through said hollow member to permit the hollow member to at least partially surround the line.

3. The apparatus of claim 2, which additionally comprises a means for adjusting a distance between the hollow member and the surface of the base member.

4. The apparatus of claim 3, in which said means for adjusting said distance between the hollow member and the surface comprises the hollow member at least partially surrounding the line in a sliding configuration.

5. The apparatus of claim 4, in which the means for adjusting the distance between the hollow member and the surface further comprises the line forming a loop with two bights of the loop passing through the hollow member.

6. The apparatus of claim 1, which additionally comprises means for moving the base member relative to said structure.

7. The apparatus of claim 6, in which a said sound attenuating means is positioned between adjacent utensils.

8. The apparatus of claim 7, in which said sound attenuating means depends from the surface of the base member.

9. The apparatus of claim 8, in which said sound attenuating means includes a line and a hollow member at least partially surrounding the line.

10. The apparatus of claim 9, which additionally comprises means for adjusting the distance between the hollow member and the surface of the base member.

11. The apparatus of claim 10, in which the means for adjusting the distance between the hollow member and the surface comprises the hollow member at least partially surrounding the line in a sliding configuration.

12. The apparatus of claim 11, in which the means for adjusting the distance between the hollow member and the surface further comprises the line forming a loop with two bights of the loop passing through the hollow member.

* * * * *